Patented Apr. 9, 1946

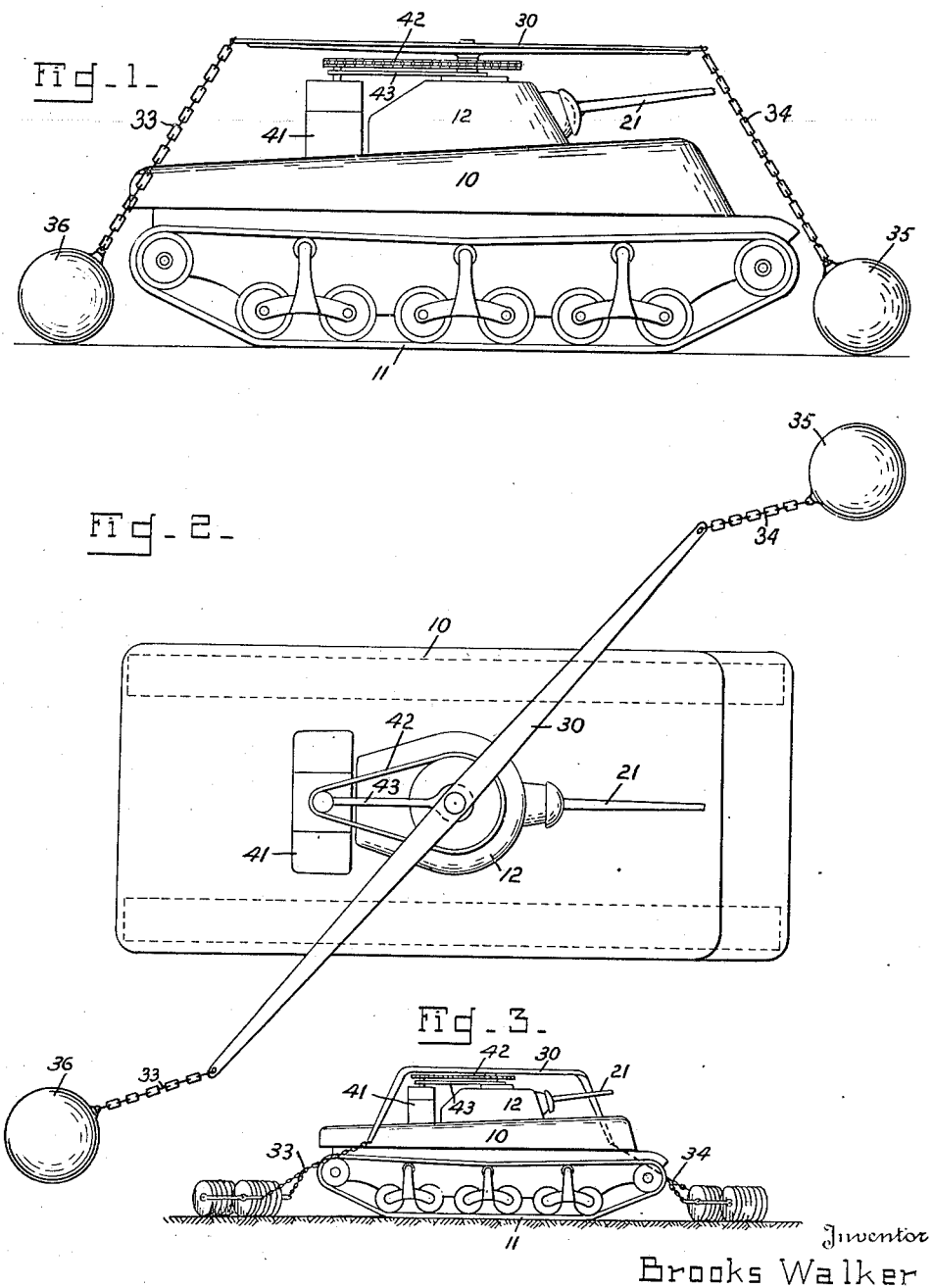

2,397,994

UNITED STATES PATENT OFFICE 2,397,994

ANTITANK MINE CLEARING DEVICE

Brooks Walker, Piedmont, Calif.

Application June 2, 1943, Serial No. 489,353

2 Claims. (Cl. 89—1)

(Granted under the act of March 3, 1883, as amended April 30, 1928; 370 O. G. 757)

The invention described herein may be manufactured and used by or for the Government for governmental purposes without the payment to me of any royalty thereon.

This invention relates to an anti-tank mine clearing device. Heretofore various types of anti-tank mine clearing devices have been employed to beat the ground in front or to the rear of a tank or powered vehicle. This invention proposes a structure that clears the mines in front and well to both sides of a moving tank by balls, rollers, harrows, etc., that travel around and around the tank by tank power or by auxiliary power to clear a wide path for the tank as well as on both sides of said tank. The centrifugal force acting on said weights will tend to throw them clear of the tank and keep them clear of the tank by the use of opposite weights on opposite ends of the rotating arm. The drag is approximately equalized on each side and stresses are reduced. The ends of the rotating arms can be bent down to reduce the angle of the towing cables or chains from the horizontal. The loading on the tank is central with this proposal. When crossing bridges, etc., the arm can be placed fore and aft and the weights placed so as not to interfere with the tank and the bridge can be negotiated with normal side clearance. For this purpose, the rollers or balls can be detached from the arm, attached to the rear of the tank and pulled behind if desired or the arm can be long enough to tow the weight ahead of the tank so as not to interfere with its operation.

Other features of this invention will be more particularly pointed out in the attached specification and claims in which:

Fig. 1 is a side elevation of one form of the invention.

Fig. 2 is a plan view of Fig. 1.

Fig. 3 is a side view of another form of the invention.

In all views like numerals of reference refer to corresponding parts of the various views. In Figs. 1 and 2, I have shown a tank 10, and track 11 with a turret 12, and a gun 21. On the turret is mounted a rotating arm 30 driven by an auxiliary power plant 41 through a suitable chain 42 or other suitable drive. A radius arm 43 may be necessary to take the chain pull. At the ends of the arm 30 are chains 33 and 34 which pull weights 36 and 35 around the tank. These weights may be balls, rollers, discs, harrows, or other suitable shapes for detonating mines and receiving a minimum damage to themselves in the process.

The ends of the arms may be formed as in Fig. 3 to reduce the angle of the touring chains. The arms will be long enough to clear the tank parts and keep the weights a safe distance from the tank during the operation.

The tank guns can be operated for the protection of the tank and destruction of the enemy by timed operation with respect to the rotation of the arm 30.

The support for the arm 30 should be flexible to take the shock of the detonating mines on the weight towing arm. The auxiliary motor 41 that drives the arm 30 should be controlled from within the tank.

While I have shown the preferred form of this invention, many modifications will be evident and all uses as pointed out here and in the attached claims are a part of this invention.

I claim:

1. A mine destroying device comprising a vehicle, a turret in and extending above said vehicle, a pivot member mounted on the top of said turret, a rotatable arm mounted on said pivot member, power means mounted on the vehicle for rotating said arm and weights attached to and depending from opposite ends of said arm in counterbalancing relationship, said weights being so constructed, arranged and connected to said rotatable arm as to contact the plane of a surface on which the vehicle rests while being dragged around said vehicle by said rotatable arm.

2. A mine destroying device comprising a vehicle, a pivot member mounted on the top of said vehicle, a rotatable arm mounted on said pivot member on said vehicle and weights attached to and depending from opposite ends of said arm in counterbalancing relationship, said weights being so constructed, arranged and connected to said rotatable arm as to contact the plane of the surface on which the vehicle rests while being dragged around said vehicle by said rotatable arm.

BROOKS WALKER.